United States Patent
Shankar

(10) Patent No.: US 9,747,294 B2
(45) Date of Patent: Aug. 29, 2017

(54) GENERIC DATA COLLECTION PLUGIN AND CONFIGURATION FILE LANGUAGE FOR SMI-S BASED AGENTS

(71) Applicant: CA, Inc., Islandia, NY (US)

(72) Inventor: Mallajosyula Venkata Udai Shankar, Hyderabad (IN)

(73) Assignee: CA, Inc., Islandia, NY (US)

( * ) Notice: Subject to any disclaimer, the term of this patent is extended or adjusted under 35 U.S.C. 154(b) by 986 days.

(21) Appl. No.: 13/887,613

(22) Filed: May 6, 2013

(65) Prior Publication Data

US 2013/0246461 A1    Sep. 19, 2013

Related U.S. Application Data

(62) Division of application No. 12/857,782, filed on Aug. 17, 2010, now Pat. No. 8,438,299.

(51) Int. Cl.
*G06F 15/16* (2006.01)
*G06F 17/30* (2006.01)
*G06F 3/06* (2006.01)

(52) U.S. Cl.
CPC ........ *G06F 17/30106* (2013.01); *G06F 3/067* (2013.01); *G06F 3/0607* (2013.01); *G06F 3/0632* (2013.01)

(58) Field of Classification Search
CPC ................................ H04L 69/08; H04L 67/10
See application file for complete search history.

(56) References Cited

U.S. PATENT DOCUMENTS

| | | | |
|---|---|---|---|
| 7,694,007 B1 | 4/2010 | Dubrovsky et al. | |
| 7,725,700 B2 * | 5/2010 | Wang | G06F 9/4401 713/1 |
| 2004/0059822 A1 | 3/2004 | Jiang et al. | |
| 2005/0138174 A1 | 6/2005 | Groves et al. | |
| 2006/0271656 A1 | 11/2006 | Yagawa | |
| 2008/0250042 A1 | 10/2008 | Mopur et al. | |
| 2010/0199037 A1 | 8/2010 | Umbehocker et al. | |
| 2010/0199276 A1 | 8/2010 | Umbehocker | |
| 2011/0218968 A1 | 9/2011 | Liu et al. | |

OTHER PUBLICATIONS

Agarwala, S. et al "Configuration Discovery and Monitoring Middleware for Enterprise Datacenters" *2010 IEEE/IFIP Network Operations and Management Symposium—NOMS 2010*, pp. 639-646.

* cited by examiner

*Primary Examiner* — Hua Fan
(74) *Attorney, Agent, or Firm* — Sage Patent Group

(57) ABSTRACT

A system and method is provided for facilitating data collection from storage devices. A generic low level module may be provided that can handle data collection for devices that store data according to particular variants of a storage standard such as SMI-S storage standard, SNMP protocol, and/or other storage standard.

7 Claims, 5 Drawing Sheets

FIG. 3a

```
*------------------------- START OF CONFIGURATION FILE -------------------------------*

START-> "START_SECTION"
                | START_SECTION /* read a \n here */
                SECTION_LIST SECTION_LIST -> SECTION
                       | SECTION /* read a \n here */
                       SECTION_LIST SECTION -> [SECTION_NAME]
                   SMI_S_SECTION_BODY
                   | SNMP_SECTION_BODY SMI_S_SECTION_BODY -> TYPE = SMI-S
                              NAME_SPACE = <name of namespace>/* read a \n
        here */
                              COMMAND = <command number>/* read a \n here*/
                              COMMAND_INFO/* read a \n here*/
                              ATTRIBUTE_LIST/* read a \n here*/
                              CHILD_LIST/* read a \n here*/
                              STEPS_LIST/* read a \n here*/

SNMP_SECTION_BODY-> TYPE = SNMP/* read a \n here*/
                            INDEX_LIST/* read a \n here*/
                            COMMAND=<command number>/* read a \n here*/
                            ATTRIBUTE_LIST/* read a \n here*/
                            CHILD_LIST/* read a \n here*/
                            STEPS_LIST/* read a \n here*/
```

FIG. 3b (Configuration File continued)

ATTRIBUTES_LIST->

ATTRIBUTES_LIST -> ATTRIBUTE
               | ATTRIBUTE /* read a \n here */
               ATTRIBUTE_LIST
               \NULL ATTRIBUTE-> ATTRIBUTEi = NAME /* read a \n here */
            TYPEi = TYPE
            | ATTRIBUTEi = NAME /* read a \n here */
            TYPEi = TYPE
            SNMP_OIDi = OID
            | ATTRIBUTEi = NAME /* read a \n here */
            TYPEi = TYPE CHILD_LIST = NCHILD = <NUMBER OF CHILDREN>
              CHILDi = SECTION_NAME
    STEPS_LIST = NSTEPS = <NUMBER OF STEPS>
              STEPi = SECTION_NAME
    INDEX_LIST = NINDEX = <NUMBER OF INDICES>
              INDEXi = INDEX_VALUE
    INDEX_VALUE = OID | PARENT_ATTRIBUTE_NAME

SMIS_SECTION = NAME

*If the attribute needs the traversal of a different association or enumeration, then SMI-S Section name is needed.*

FIG. 3c

(configuration file continued)

COMMAND_INFO = INFORMATION SPECIFIC TO SMI-S /SNMP COMMAND
UNDER CONSIDERATION

OID-> /*SNMP OID*/

TYPE-> /* ALL Dictionary Types */

BITSTRING-> A Lexeme for (0/1)*

*------------------------- END OF CONFIGURATION FILE --------------------------------*

GENERIC DATA COLLECTION PLUGIN AND CONFIGURATION FILE LANGUAGE FOR SMI-S BASED AGENTS

TECHNICAL FIELD

The invention relates to the field of storage management systems and products. More particularly, the invention relates to managing data collection for storage management systems and products.

BACKGROUND

Storage Management Initiative Specification (SMI-S) is a storage standard developed by SNIA (Storage Networking Industry Association) and it uses CIM (Common Information Model) to manage storage devices (e.g., Storage area network devices, i.e., SAN devices) from multiple vendors. Each storage device has a profile in the SMI-S model that specifies classes available in that management model, objects associated with the classes, and/or the associations that are required to be traversed to get particular data associated with the storage device. For example, SMI-S includes profiles and sub-profiles for disk arrays, switches, storage virtualizers, host bus adapters, tape libraries, and/or other storage devices/systems.

An SMI-S profile associated with a storage device defines classes, attributes, associations, and/or intrinsic/extrinsic methods that may be used to perform a particular management function. SMI-S enables storage management applications, for example, an SRM (Storage resource management) application (or other management application) to support and manage various storage devices from different vendors using a standard interface based on the CIM protocol. An SRM application may communicate with the storage devices through their respective vendor-specific SMI-S providers/agents. A particular SMI-S provider/agent associated with a particular storage device may query the storage device for information associated with the objects, attributes, associations, and/or methods defined in the corresponding class/profile.

The CIM model in the SMI-S specification is interpreted differently by different vendors. Each different vendor of a storage device may have its own interpretation of the profile associated with the storage device and implementation of the classes defined in the profile. Typically, the vendors extend (inherit) the CIM classes to add their own additional attributes. Per the SMI-S standard, each class defined in the profile may include some mandatory attributes/methods and some optional attributes/methods. For example, for a disk array class, name and serial number may be mandatory attributes, wherein each vendor of the disk array may be required to define these attributes. However, each vendor may add different optional attributes, may have a different format for the name attribute, and/or may define associations differently, thereby making their interpretations of the profile different from one another.

An SRM application may comprise multiple low level DLLs for each storage device. For example, an SRM application may comprise a separate low level DLL for each vendor of a disk array (for example, to support each vendor's interpretation of the profile). Also, with respect to the versions of SMI-S, there may be different low level DLLs. The DLLs communicate with the SMI-S provider/agent associated with the storage device (e.g. disk array) to extract desired information from the storage device. In other words, the DLLs communicate with the SMI-S provider/agent that in turn queries the storage device for information associated with the objects, attributes, associations, and/or methods defined in the corresponding class/profile, and provides the retrieved information to the SRM application.

Managing multiple low level DLLs for each storage device in a storage area network is a cumbersome task. SMI-S versions may be periodically updated, introducing at least some changes to the CIM object model. For example, an updated SMI-S version may change classes, attributes, or other information specified in the CIM object model, resulting in the way SMI-S profiles are handled. In conventional systems, changes to the low level DLLs may need to be made according to the updated SMI-S version because the DLLs typically encode the CIM object model. In other words, each time an SMI-S version changes, the DLLs may have to be re-written because each DLL typically includes hard-coding that specifies or otherwise describes the CIM object model for its associated storage device. The need to update DLLs may be exacerbated because of code redundancy among different DLLs, making maintenance of the DLLs difficult. Apart from the code for handling SMI-S and the CIM object model, the different DLLs typically share common code with one another. Thus, maintaining various DLLs may become inefficient and problematic, especially given the wide range of different types/vendors of storage devices and updates to the SMI-S.

Another problem with conventional systems is that different types of protocols may not be managed efficiently. For example, some storage devices may use only SMI-S, only Simple Network Management Protocol (SNMP), only another protocol or combination of protocols. However, each type of protocol may be associated with respective DLLs, Management Information Bases, or other sources of information, further exacerbating the problem of maintaining different sources of information for managing storage devices.

Thus, what is needed is an efficient way of managing access to data from storage devices according to the SMI-S, SNMP, and/or other protocol or combination of protocols without the need to update DLLs or other sources of information used to access data from the storage devices. These and other drawbacks exist.

SUMMARY

In some implementations, the invention relates to a system and method for facilitating data collection from one or more storage devices (for example, SAN devices). A generic low level module may be used for data collection for devices that store data according to particular variants of a storage standard such as SMI-S storage standard, SNMP protocol, and/or other storage standard. Particular variants of a storage standard may include different versions (e.g., a version 1.1 as opposed to a version 1.2) of a storage standard, different interpretations by different vendors of the same storage standard, and/or other differences in the way a storage standard can model data for the storage device. The SMI-S profile associated with each storage device may be provided in the form of a configuration file and may be used by the generic low level module to collect the data from the storage device.

In some implementations of the invention, a particular variant of the storage standard may cause data to be collected differently than another variant of the storage standard. For example, one version of the storage standard may name an object with a name different from the name specified by another version of the storage standard. In another example, one vendor may interpret the storage standard differently than another vendor by extending a class with additional attributes. Other differences in, or interpretations of, commands, objects, attributes, and/or other data associated with the storage device may cause the data be collected differently according to different variants of storage standards.

In some implementations of the invention, the configuration file may include configuration information that describes the particular variant of the storage standard so that data may be collected from different storage devices using different variants of the storage standard. For example, the configuration information may include commands, parameters of commands, objects to be collected, attributes of objects to be collected, and/or other data to be collected from storage device according to different variants of the storage standard. In this manner, information used to describe different variants of storage standards may be placed in configuration files that are easy to change rather than low level modules that are redundant and difficult to maintain.

In some implementations of the invention, the configuration file may specify that data is to be collected via SMI-S, SNMP, and/or other data management protocol. The configuration file may be written in a configuration file language that not only describes the profile that is specific to storage device under consideration, but also specifies the objects to be collected and the attributes that are required.

As such, a single generic low level module may be provided that can handle an SMI-S profile based on the configuration file, even with interleaved SNMP (Simple Network Management Protocol) based data collection. Thus, the need to maintain multiple low level modules (i.e. DLLs) can be eliminated while providing flexibility to retrieve data from storage devices according to different types and/or versions of storage standards.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

FIGS. 3a-3c illustrate an exemplary configuration file, according to various aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
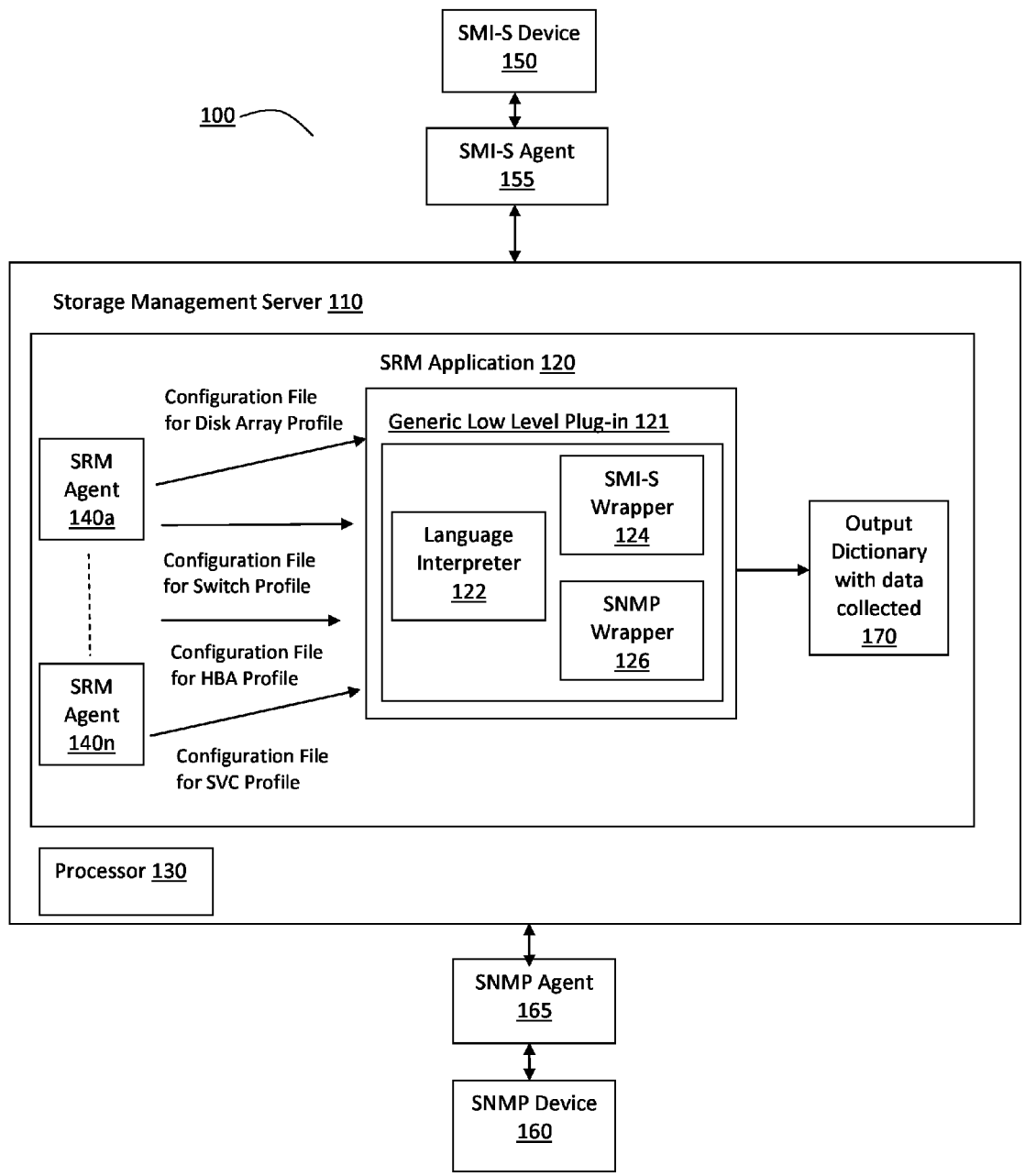
FIG. 1 illustrates an exemplary storage management system, according to various aspects of the invention.

FIG. 1 is an exemplary illustration of a storage management system 100, according to an aspect of the invention. Storage management system 100 may include, among other things, at least a storage management server 110 that is configured to support and manage one or more storage devices 150, 160 in a storage area network. At least one storage device of the one or more storage devices may be a SMI-S device 150, wherein storage management server 110 may manage data collection from SMI-S device 150 based on the SMI-S standard. At least one storage device of the one or more storage devices may be a SNMP device 160, wherein storage management server 110 may manage data collection from SNMP device 160 based on the SNMP standard. It will be understood that while a single SMI-S device 150 and SNMP device 160 have been depicted in FIG. 1, storage management server 110 may manage data collection associated with any number of SMI-S devices 150 with any number of corresponding SMI-S agents 155 and any number of SNMP devices 160 with any number of corresponding SNMP agents 165, without departing from the scope of the invention. SMI-S agents 155 (which may also be referred to as SMI-S providers) may communicate with the corresponding SMI-S devices 150 and facilitate data collection from the SMI-S devices 150. Similarly, SNMP agents 165 may communicate with the corresponding SNMP devices 160 and facilitate data collection from the SNMP devices 160.

Storage management server 110 may include a processor 130, circuitry and/or other hardware operable to execute computer-readable instructions. According to one aspect of the invention, storage management system 100 may include one or more tangible computer-readable storage media configured to store one or more software modules, wherein the software modules include computer-readable instructions that when executed by the processor cause the processor to perform the functions described herein. According to one implementation, storage management server 110 may comprise computer hardware programmed with a computer application, such as, SRM (storage resource management) application 120, having one or more software modules that enable the various features and functions of the invention. Non-limiting examples of the software modules in the application may include one or more of SRM agents 140a, . . . , 140n, a generic low level module 121, and/or other modules for performing the features and functions described herein. Generic low level module 121 may include one or more sub-modules, such as, language interpreter 122, SMI-S wrapper 124, SNMP wrapper 126, and/or other sub-modules for performing the features and functions described herein.

Each SRM agent 140a, . . . , 140n may be responsible for collecting data about a specific type of SMI-S device 150 and/or SNMP device (for example, disk array, switch, HBA, SVC, and/or other types of storage devices). SRM agents 140a, . . . , 140n may communicate with the generic low level module 121 to collect data regarding the SMI-S device 150 and/or SNMP device 160 from the corresponding SMI-S agent 155 and/or SNMP agent 165.

Administrators (or other users) may interact with the storage management server 110/SRM application 120 to invoke one or more SRM agents 140a, . . . , 140n. SRM agents 140a, . . . , 140n may each comprise a user interface (not illustrated in FIG. 1) configured to facilitate interaction with storage management server 110/SRM application 120. Such interaction may include, for example, generating configuration files for various SMI-S profiles, providing requests for data from one or more storage devices, adding storage devices, removing storage devices, changing storage device configurations, viewing status, performance, and/or health of discovered storage devices, and/or performing other operations. In some implementations of the invention, SRM agents 140a, . . . , 140n may generate and/or present the user interface to one or more client devices (not otherwise illustrated in FIG. 1). The client devices may include a processor, circuitry, and/or other hardware configured to execute computer-readable instructions.

In one implementation, generic low level module 121 (which may also be referred to as a generic data collection plug-in) may receive one or more configuration files. Each SMI-S device 150 may have an SMI-S profile associated with it. One configuration file may be generated or written (such as, for example, manually by a user) for each SMI-S profile. In other words, a configuration file may be generated according to the SMI-S profile using the SMI-S specification. SMI-S device 150 may be a disk array, a host bus adapter (HBA), a switch, a San Volume Controller (SVC), and/or any other storage device that can store data according to a standard or protocol such as SMI-S. In one implementation, a configuration file may be generated or written (such as, for example, manually by a user) for a disk array profile, a switch profile, a HBA profile, a SVC profile, and/or any other storage device profile, per the SMI-S specification.

In one implementation, a configuration file may describe a SMI-S profile. The configuration file may include, among other things, information on how particular vendor(s) interpret the profile (i.e., vendor specific interpretations of the profile), information of extended CIM classes for particular vendor(s), information on how data is to be collected for the corresponding storage device, information regarding the objects, attributes, methods, and/or associations that are to be collected from the corresponding storage device, information on how the objects, attributes, methods, and/or associations are to be collected from the corresponding storage device, and/or what mode of data collection is required (i.e., SMI-S, or SNMP, or both).

Based on the received configuration file, generic low level module 121 may communicate with a corresponding SMI-S agent 155 to collect data from the corresponding SMI-S device 150. For example, a configuration file for a disk array profile may be received. Generic low level module 121 may, based on the received configuration file, communicate with an SMI-S agent associated with the disk array storage device. Similarly, for configuration files associated with other SMI-S profiles (e.g., switch profile, HBA profile, SVC profile, etc.), generic low level module 121 may communicate with an SMI-S agent associated with the corresponding storage device (switch, HBA, SVC, etc.) and may accordingly perform data collection. As such, generic low level module 121 may communicate with one or more SMI-S agents based on the received configuration file, wherein each SMI-S agent may be configured to query the corresponding SMI-S device, collect data from the SMI-S device, and provide the collected data to generic low level module 121.

In one implementation, data may need to be collected from SNMP device 160, instead or in addition to, SMI-S device 150. For example, data regarding some attributes may need to be collected from SMI-S device 150, and data regarding some other attributes may need to be collected from SNMP device 160. In one implementation, the configuration file may indicate a mode of data collection (i.e., SMI-S or SNMP). Based on the configuration file (i.e. data collection mode specified in the configuration file), generic low level module 121 may communicate with SMI-S agent 155, or SNMP agent 165, or both, to collect data (e.g., attribute or other data) from corresponding SMI-S device 150 and/or SNMP device 160.

In one implementation, SMI-S agent 155 may reside and run on SMI-S device 150. SNMP agent 165 may reside and run on SNMP device 160. SMIS-device 150 and SNMP device 160 may include one or more tangible computer-readable storage media configured to store one or more software agents, wherein the software agents include computer-readable instructions that when executed by corresponding processors (not shown) cause the processors to perform the functions described herein.

In one implementation, SMI-S device 150 and SNMP device 160 may represent the same type of storage device (e.g., switch), but may use different data collection protocols (SMI-S and SNMP, respectively) for collecting data. The configuration file associated with the switch/switch profile may include information on how and what data is to be collected from either or both SMI-S device 150 and SNMP device 160. In other words, a single storage device may support data collection based on various data collection protocols (e.g., SMI-S, SNMP, and/or other standards) and the configuration file associated with the storage device may include information on how and what data is to be collected from the storage device via the data collection protocols.

In one implementation, the configuration file may include instructions that describe storage devices 150, 160. In some implementations of the invention, generic low level module 121 may use the instructions to determine data that is to be retrieved from storage devices 150, 160. In some implementations of the invention, generic low level module 121 may use the instructions to determine how to retrieve such data. In this manner, generic low level module 121 may be independent of the storage device from which data is collected. Thus, by using the configuration file, vendor-specific extensions to the SMI-S specification (and/or other variations in the way in which one device stores data from another device) may be described without changing or otherwise creating new code to manage the storage device.

In some implementations of the invention, data from various storage devices (for example, disk array, switch, HBA, SVC, or any other storage device) can be collected via generic low level module 121. For example, when a new version of SMI-S is released, no changes to the general low level module 121 are required, and/or no new plug-in is needed. Instead, a proper configuration file may be written/generated and generic low level module 121 may be invoked from the SRM agent 140a, . . . , 140n. In some implementations of the invention, disk arrays, for example, may have their own configuration files while switches may have their own. Thus, an SRM agent associated with a disk array storage device may invoke the generic low level module 121 with the configuration file for disk array profile. Similarly, an SRM agent associated with a switch storage device may invoke the generic low level module 121 with the configuration file for switch profile. As such, any storage device that is collected through SMI-S standard may use generic low level module 121 to collect data from the storage device.

In some implementations, a user (e.g., an administrator or other user) may interact with SRM application 120 to register at least one storage device (e.g., SMI-S device 150 and/or SNMP device 160, which may include, but not be limited to, switch, disk array, HBA, SVC etc.) for which data is to be collected. In other words, a user may request to retrieve data from at least one storage device (i.e., a storage device that may use a particular variant of a SMI-S storage standard, a particular variant of a SNMP storage standard, and/or other type of storage standard). An SRM agent 140a, . . . , 140n associated with the at least one storage device may receive the user request. In some implementations, the user request may include one or more parameters, including but not limited to, IP address of SMI-S/SNMP agent, namespace, etc.

In some implementations, the SRM agent associated with the at least one storage device may provide a configuration file associated with the at least one storage device to the generic low level module 121. In other words, the SRM agent may be aware of the configuration file that is to be provided to the generic low level module 121. In some implementations, the SRM agent may invoke the generic low level module 121 with the appropriate configuration file to obtain the data. Generic low level module 121 may receive the configuration file, may parse the configuration file, and may communicate with a SMI-S agent 155 or SNMP agent 165 to collect requested data from the appropriate storage device (i.e., SMI-S device 150 or SNMP device 160) identified in the request (based on the configuration file, for example).

In some implementations, generic low level module 121 may output the collected data in the form of a dictionary 170. Generic low level module 121 may provide dictionary 170 (containing a list of objects collected based on the configuration file) to the SRM agent that invoked the generic low level module 121. In some implementations of the invention, dictionary 170 may include a data structure having key value pairs that may be based on a Standard Template Library (STL) map. In some implementations of the invention, SRM agent may store dictionary 170 in a database (not otherwise illustrated in FIG. 1). The SRM agent may present the collected data to the user via a user interface.

In some implementations, generic low level module 121 may comprise language interpreter 122, SMI-S wrapper 124, SNMP wrapper 126, and/or other sub-modules. Language interpreter 122 may interpret a received configuration file. In other words, language interpreter 122 may parse and determine contents of the configuration file. Language interpreter 122 may parse the received configuration file and determine whether commands in the configuration file are to be sent to the SMI-S wrapper 124 or the SNMP wrapper 126 for execution. Based on the type of commands and/or the mode of data collection specified in the configuration file, language interpreter 122 may determine whether the commands are to be sent to SMI-S wrapper 124 or SNMP wrapper 126, or both. In some implementations of the invention, the determination is made based on a section/command type specified in the configuration file. For example, if a section/command type specified is SMI-S, a determination may be made that one or more commands are to be sent to SMI-S wrapper 124 for execution. If a section/command type specified is SNMP, a determination may be made that one or more commands are to be sent to SNMP wrapper 126 for execution. SMI-S wrapper 124 may be a wrapper over Pegasus libraries that communicates with SMI-S agent(s) 155. SNMP wrapper 126 may be a wrapper over NetSNMP that communicates with SNMP agent(s) 165. SMI-S agent(s) 155 and SNMP agent(s) 165 may query the SMI-S device(s) 150 and SNMP device(s) 160, respectively, may collect the appropriate data from the devices, and may provide the collected data to generic low level module 121.

Generic low level module 121 may perform data collection using SMI-S, SNMP, and/or any other data collection protocol. As such, while FIG. 1 depicts SMI-S and/or SNMP based data collection, any other type of data collection protocol may be used instead or in addition to the SMI-S and/or SNMP protocols. The configuration file may be accordingly enhanced to support the other types of data collection protocols and appropriate wrappers may be created in the generic low level module 121 to handle command execution.

In one implementation, the configuration file for each SMI-S profile may include one or more sections. In some implementations of the invention, each section may specify a particular protocol for data collection such as, for example, SMI-S or SNMP based data collection. Each section may have a type associated with it along with a command and command specific information. In some implementations of the invention, each section may also include a list of attributes, children and /or processes. Language interpreter 122 of generic low level module 121 may parse the sections of the configuration file and may pass the commands in the sections to either SMI-S wrapper 124 and/or SNMP wrapper 126. In some implementations, language interpreter 122 may pass the commands to the appropriate wrappers based on, for example, the type of section/command specified in the configuration file. For example, if the section/command type is specified as SMI-S (i.e., data collection mode is SMI-S) the commands in the corresponding section are sent to SMI-S wrapper 124. Similarly, if the section/command type is specified as SNMP (i.e., data collection mode is SNMP), the commands in the corresponding section are sent to SNMP wrapper 126. The SMI-S wrapper 124 and SNMP wrapper 126 may be configured to execute the commands from language interpreter 122. In some implementations, the configuration file may have at least one section that specifies a first data collection mode as SMI-S and at least another section that specifies a second data collection mode as SNMP (for the same type of storage device, for example).

For illustrative purposes only, a typical section may include the following syntax or grammar:

```
[START]
Command=1
class=CIM_AdminDomain
Namespace=root/switch
Type=SMI-S
Name=FABRIC
nAttributes=2
Attribute1=[NAME,12,Name]
Attribute2=[WWN,12,Name]
nchildren=1
Child1=QLOGIC_DISCOVER_SWITCH
```

In the foregoing non-limiting example syntax, the command type in the section is identified by the "Type" key. In this example, the command type (as indicated by the Type key) indicates a SMI-S based protocol described by the section, indicating that commands in the section are associated with SMI-S commands. Thus, the command type in this section specifies a SMI-S data collection mode. As such, language interpreter 122 may send the SMI-S command to SMI-S wrapper 124 for execution.

In this example, the command is indicated by the "Command" key, having a value "1." In other words, the configuration file indicates that a command "1" is to be executed using a data collection mode of SMI-S. SMI-S wrapper 124 may be configured to execute command "1" using SMI-S data collection. SMI-S wrapper 124 may execute the SMI-S command with "Namespace" and "class" information. In this particular example, the SMI-S command "1" may be a command to "list all instances." As such, SMI-S wrapper 124 may accordingly execute the SMI-S command and cause a listing of all instances of "CIM_AdminDomain" and collection of the two attributes ("Attribute 1" and "Attribute 2") listed above (from SMI-S Agent 155, from example).

In this example syntax, the "Name" of the type of objects collected by this process may be specified as "FABRIC." In this example, a child list exists with one child and the list of children may be obtained by passing the section name mentioned against the key "Child 1". The list of objects obtained by executing the section mentioned against "Child 1", become the children of the fabric object. These, in this particular case, may be all switches in the FABRIC. Thus, the configuration file may, as illustrated in the foregoing example syntax, include various commands, hierarchies of data relationships, and/or other information that facilitates data collection from various data devices.

In some implementations of the invention, the configuration file may include a list of processes (i.e., steps list). The processes may include an indication of one or more sections to be executed to obtain information about the object described in the section. For example, if additional command(s) (e.g., an SNMP command) is to be executed to obtain/collect another set of attributes associated with the FABRIC object, appropriate processes may be added to the sections. In this case, the command type may be specified as SNMP and may identify the data collection mode to be SNMP. As such, language interpreter 122 may send the SNMP command to SNMP wrapper 126 for execution. SNMP wrapper 126 may be configured to execute this SNMP command. SNMP wrapper 126 may accordingly execute the SNMP command and collect the appropriate data from SNMP Agent 165.

In some implementations, language interpreter 122 may pass commands to SMI-S wrapper 124, SNMP wrapper 126, and/or other wrappers for other data collection protocols. The various wrappers may be configured to execute the corresponding commands passed to them. Once the commands have been executed, a list of objects, along with the children, may be passed to the generic low level module 121, which in turn returns the dictionary of objects to the SRM agent that invoked the generic low level module 121 for the data.

In one implementation, the one or more sections of the configuration file may have section names. The section names may be prefixed with context information. The context information may be used to specify multiple vendors associated with a storage device and multiple SMI-S versions. For example, a switch may be a Qlogic switch, Brocade switch or any other type of switch. As such, the section name SWITCH may be prefixed with vendor/type of switch information. Also, the version of SMI-S may be 1.1 or 1.2.

FIGS. 3*a*-3*c* depicts an exemplary grammar for the configuration file, wherein context free language for the configuration file is presented in a readable fashion. As would be appreciated, the configuration file grammar/language illustrated in FIGS. 3*a*-3*c* is merely a non-limiting example; any file language (such as Extensible markup language) that can logically store the information of the configuration file described herein may be utilized. The configuration file language may be written in an INI file (for example, the INI file may be a specific kind of configuration file). Thus, having knowledge of SMI-S specification, profiles, and/or other storage standard/protocol, a configuration file may be generated even without programming knowledge.

Figure 2:
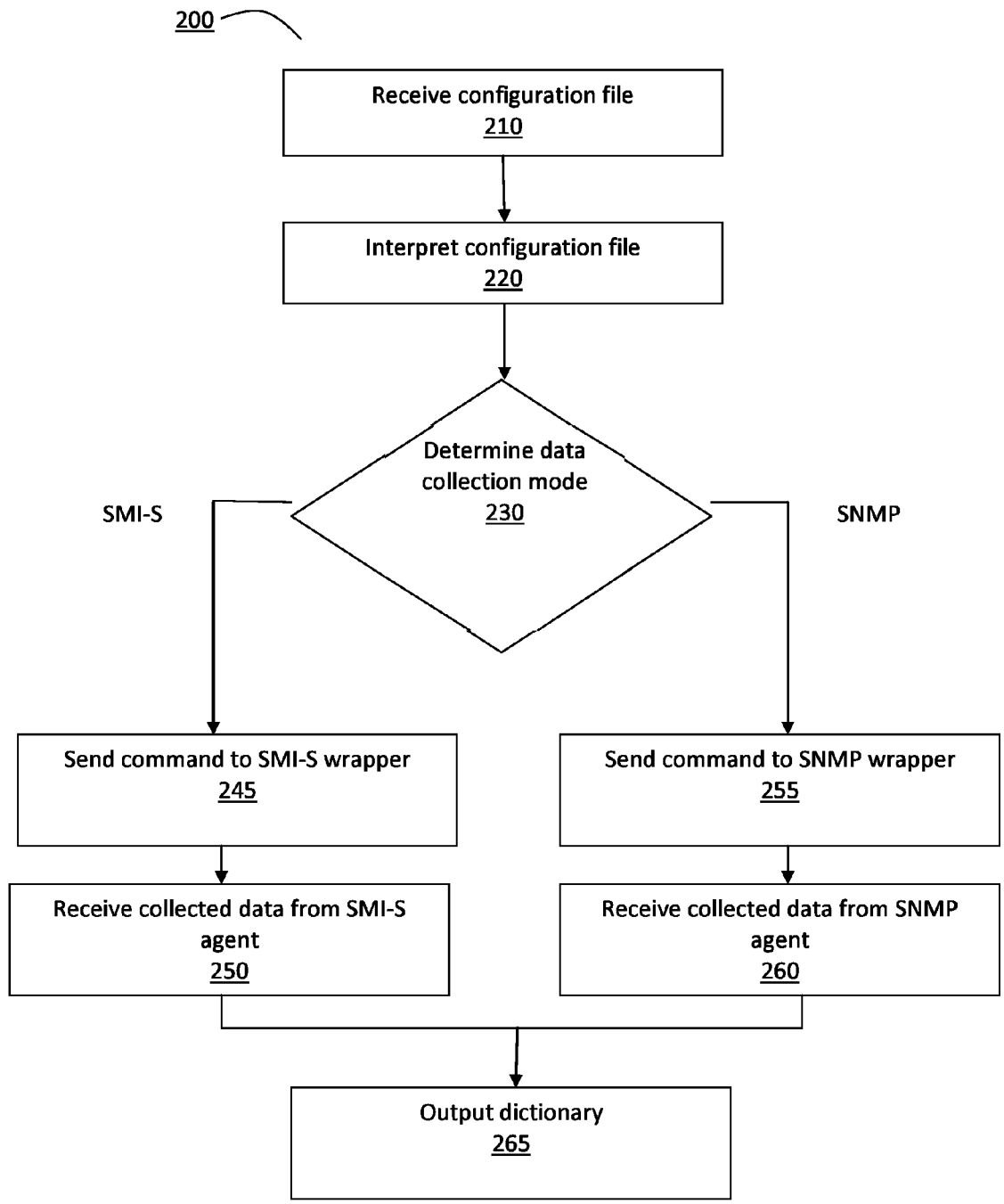
FIG. 2 illustrates a flowchart depicting example operations performed by the storage management system, according to various aspects of the invention.

FIG. 2 is a flowchart depicting example operations performed by storage management system 100, according to various aspects of the invention. In some implementations, the example operations may be performed by one or more modules/sub-modules associated with the storage management system 100. In some implementations, various operations may be performed in different sequences. In other implementations, additional operations may be performed along with some or all of the operations shown in FIG. 2. In yet other implementations, one or more operations may be performed simultaneously. In yet other implementations, one or more operations may not be performed. Accordingly, the operations described are exemplary in nature and, as such, should not be viewed as limiting.

In operation 210, at least one configuration file associated with a storage device may be received, by generic low level module 121, for example. In some implementations, generic low level module 121 may receive the configuration file from an SRM agent associated with the storage device (in response to a request to retrieve data from the storage device, for example). In some implementations, generic low level module 121 may be invoked with the configuration file by the SRM agent. The at least one configuration file may describe an SMI-S profile, wherein the SMI-S profile may be associated with a storage device 150. The configuration file may include, among other things, information on how particular vendor(s) interpret the profile (i.e., vendor specific interpretations of the profile), information of extended CIM classes for particular vendor(s), information on how data is to be collected for the corresponding storage device, information regarding the objects, attributes, methods, and/or associations that are to be collected from the corresponding storage device, information on how the objects, attributes, methods, and/or associations are to be collected from the corresponding storage device, and/or what mode of data collection is required (i.e., SMI-S, or SNMP, or both).

In operation 220, the configuration file may be interpreted, by language interpreter 122, for example. In operation 230, a data collection mode may be determined based on the configuration file, by language interpreter 122, for example. In one implementation, the configuration file may include section/command type information. When the section/command type information specifies SMI-S, a determination may be made the data is to be collected using SMI-S (i.e., the data collection mode is SMI-S). When the section/command type information specifies SNMP, a determination may be made that data is to be collected using SNMP (i.e. the data collection mode is SNMP).

In operation 245, in response to a determination that the data collection mode is SMI-S, one or more commands (from the configuration file) may be sent to SMI-S wrapper 124, by language interpreter 122, for example. SMI-S wrapper 124 may communicate with SMI-S agent(s) 155. SMI-S agent(s) 155 may collect data from SMI-S device(s) 150. In operation 250, the collected data from SMI-S agent(s) 155 may be received, by generic low level module 121, for example.

In operation 255, in response to a determination that the data collection mode is SNMP, one or more commands (from the configuration file) may be sent to SNMP wrapper 126, by language interpreter 122, for example. SNMP wrapper 126 may communicate with SNMP agent(s) 165. SNMP agent(s) 165 may collect data from SNMP device(s) 160. In operation 260, the collected data from SNMP agent(s) 165 may be received, by generic low level module 121, for example.

It will be understood that other mechanisms may be used to specify the mode of data collection in the configuration file without departing from the scope of the invention. For example, a data collection flag may be specified. When an ith bit in the collection flag is 0, a determination may be made that the ith attributes are to be collected using SMI-S, When an ith bit in the collection flag is 1, a determination may be made that the ith attributes are to be collected using SNMP.

In operation 265, a dictionary 170 may be output including data collected from SMI-S device(s) 150, SNMP device(s) 160, or both. In some implementations, generic low level module 121 may provide the dictionary 170 to the SRM agent that invoked the generic low level module 121.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for facilitating data collection from one or more storage devices, the method executed by one or more processors configured to perform a plurality of operations, the operations comprising:
   receiving a first request to retrieve first data from a first storage device that uses a first variant of a first storage standard, wherein the requested first data is to be retrieved according to the first variant of the first storage standard;
   receiving a second request to retrieve second data from a second storage device that uses a second variant of a second storage standard, wherein the requested second data is to be retrieved according to the second variant of the second storage standard, wherein the first variant and the second variant are different from one another;
   receiving a first configuration file associated with the first storage device, wherein the first configuration file includes first configuration information that describes the first variant;
   receiving a second configuration file associated with the second storage device, wherein the second configuration file includes second configuration information that describes the second variant;
   parsing the first and second configuration information from the first and second configuration files; and
   retrieving the requested first and second data from the first and second storage devices based on the parsed first and second configuration information;
   wherein the first variant of the first storage standard is a variant of a SMI-S storage standard and the second variant of the second storage standard is a variant of SNMP.

2. The computer-implemented method of claim 1, wherein the first variant of the first storage standard is a particular version of the SMI-S storage standard and the second variant of the second storage standard is a particular version of the SNMP storage standard.

3. The computer-implemented method of claim 1, wherein the first variant of the first storage standard is a vendor-specific interpretation of the SMI-S storage standard and the second variant of the second storage standard is a vendor-specific interpretation of the SNMP storage standard.

4. The computer-implemented method of claim 1, wherein retrieving the requested first data comprises:
   receiving first collected data from a first agent associated with the first storage device; and
   receiving second collected data from a second agent associated with the first storage device.

5. The computer-implemented method of claim 4, further comprising:
   generating an output dictionary based on the first and second collected data.

6. The computer-implemented method of claim 1, wherein retrieving the requested second data comprises:
   receiving first collected data from a first agent associated with the second storage device; and
   receiving second collected data from a second agent associated with the second storage device.

7. The computer-implemented method of claim 6, further comprising:
   generating an output dictionary based on the first and second collected data.

* * * * *